Nov. 28, 1950  E. Y. GUTHMANN  2,531,774
LIQUID LEVEL GAUGE
Filed March 13, 1947  3 Sheets-Sheet 1

Inventor:
Eugene Y. Guthmann
by his Attorneys
Howson & Howson

Nov. 28, 1950 — E. Y. GUTHMANN — 2,531,774
LIQUID LEVEL GAUGE
Filed March 13, 1947 — 3 Sheets-Sheet 2
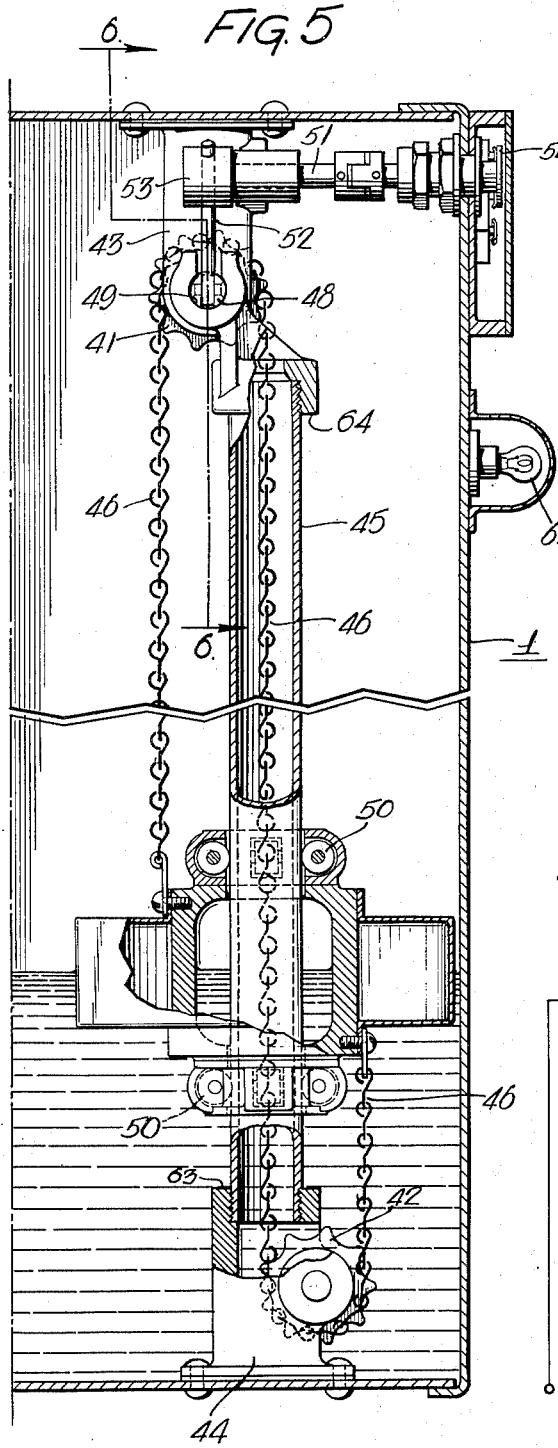
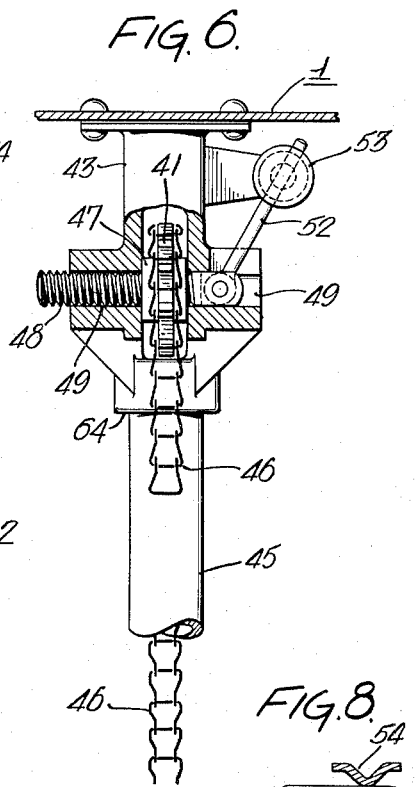
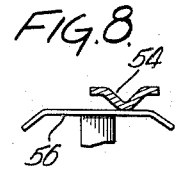
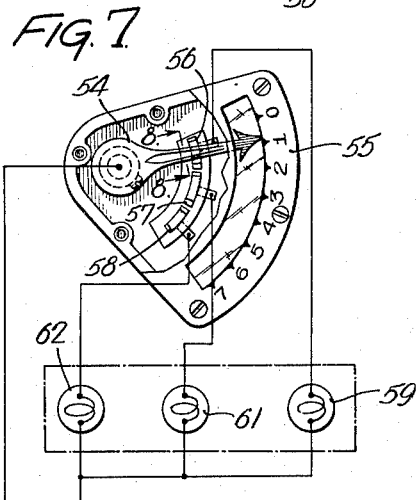
Inventor:
Eugene Y. Guthmann
by his Attorneys
Howson & Howson Nov. 28, 1950    E. Y. GUTHMANN    2,531,774
LIQUID LEVEL GAUGE
Filed March 13, 1947    3 Sheets—Sheet 3
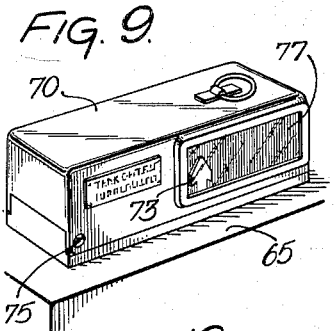
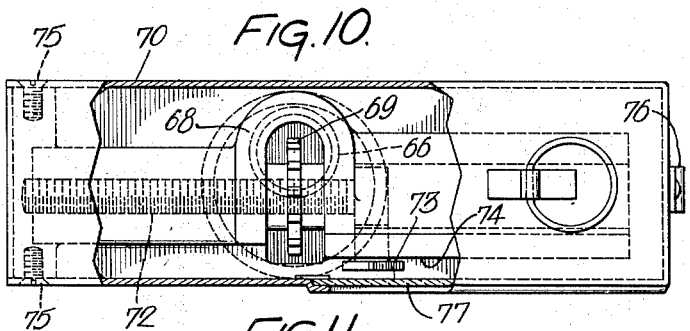
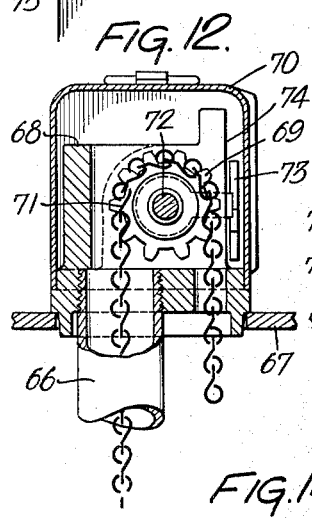
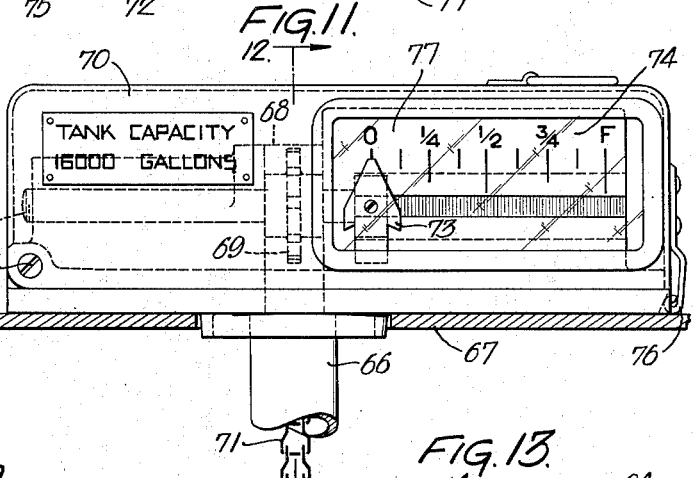
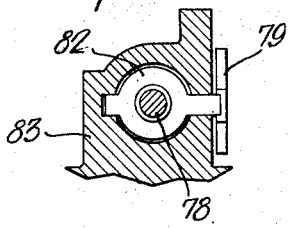
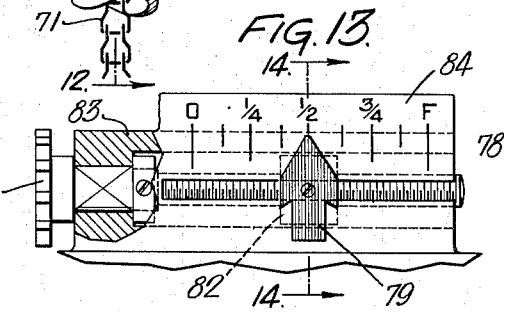
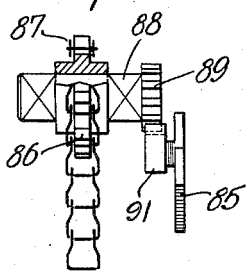
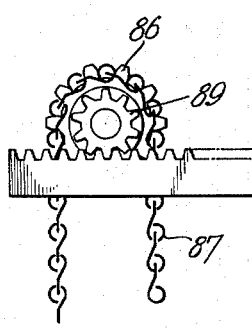
Inventor:
Eugene Y. Guthmann
by his Attorneys
Howson & Howson Patented Nov. 28, 1950

2,531,774

UNITED STATES PATENT OFFICE 2,531,774

LIQUID LEVEL GAUGE

Eugene Y. Guthmann, Philadelphia, Pa.

Application March 13, 1947, Serial No. 734,330

4 Claims. (Cl. 73—321)

This invention relates to liquid level indicators and more particularly to a liquid level gauge adapted for use in locomotive tenders.

A principal object of the invention is to provide an indicator of the stated class having a simplified and generally improved structural form and the compactness and ruggedness required in a device properly adapted for use in a locomotive tender.

Another object is to provide a device of the stated character wherein, by reason of inherent structural simplicity, the absence of intricate parts, and a favorably symmetrical arrangement of elements, friction is reduced to a practical minimum and sensitivity correspondingly increased.

The invention resides further in certain novel structural and mechanical details hereinafter described and illustrated in the attached drawings wherein:

Fig. 5 is an enlarged sectional view corresponding to Fig. 2 and illustrating a modification within the scope of the invention;

Fig. 6 is a sectional view on the line 6—6, Fig. 5;

Fig. 7 is a front elevational view of the indicator portion of the device illustrated in Fig. 5 with a portion of the cover plate of the indicator housing cut away to disclose the operation elements, and showing also a diagram of the associated electrical system;

Fig. 8 is a section on the line 8—8, Fig. 7;

Fig. 9 is a view in perspective of a modified form of indicator device;

Fig. 10 is an enlarged top plan view of the device shown in Fig. 9, a part of the casing being broken away to disclose the working elements within;

Fig. 11 is an enlarged front elevational view of the device shown in Fig. 9;

Fig. 12 is a sectional view on the line 12—12, Fig. 9;

Fig. 13 is a fragmentary front elevational view showing a modification of the device illustrated in the immediately preceding figures;

Fig. 14 is a section on the line 14—14, Fig. 13;

Fig. 15 is a diagrammatic illustration of still another form of indicator device, and Fig. 16 is an end view of the assembly shown in Fig. 15.

Figure 1:
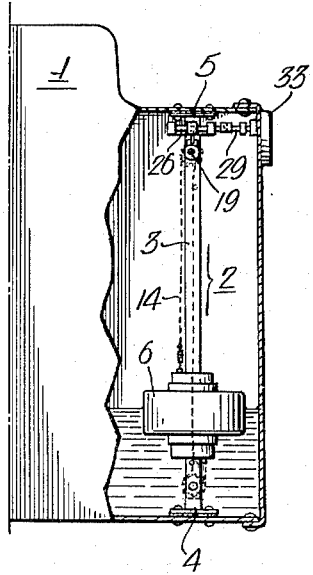
Fig. 1 is a fragmentary elevational sectional view showing one end of a locomotive tender equipped with a tank gauge made in accordance with the invention.
Figure 2:
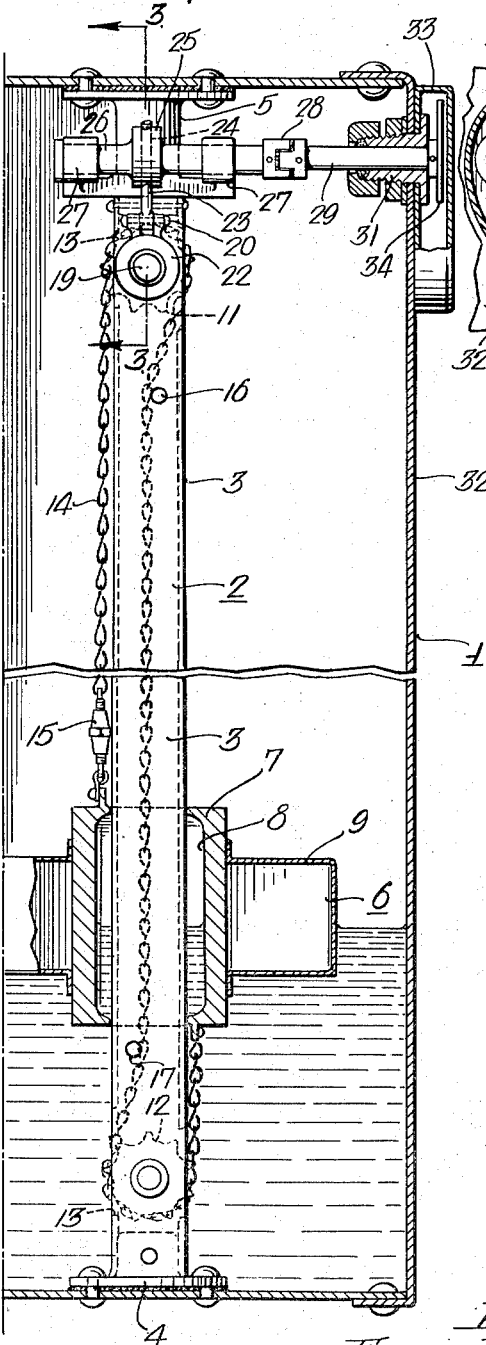
Fig. 2 is an enlarged fragmentary sectional view showing the details of the gauge device shown in Fig. 1.

With reference to Figs. 1 to 4 inclusive of the drawings, the reference numeral 1 indicates the forward end of a locomotive tender, the side wall of the tender being broken away in order to expose a liquid level gauge indicated generally by the reference numeral 2 which is mounted in the interior of the tank. The gauge is more clearly illustrated in Fig. 2 wherein it is shown as comprising a tubular standard 3 which is secured to the bottom of the tank by means of a lower terminal fitting 4, and which is similarly secured to the top wall of the tank through the medium of a top terminal fitting 5. The device also comprises a float 6 which is arranged to rise and fall with the liquid level in the tank and which is guided in its up and down movement by the standard 3. In the present instance the float comprises a central hollow cylindrical portion 7 which slidably embraces the standard 3 and which functions as a weight for a purpose hereinafter set forth. The inner wall 8 of this member 7 is recessed so that only a small surface area at the top and bottom of the member actually contacts the surface of the standard 3, thus reducing frictional contact between the element 7 and the standard to a minimum. The float unit also comprises a thin-walled casing 9 which extends outwardly from the sides of the element 7 and which is hermetically sealed so as to function as the float proper. It will be noted that this float structure is entirely symmetrical about the vertical center line.

Mounted at the top and bottom respectively of the standard 3 is a sprocket, 11 and 12 respectively, these sprockets being suitably journaled in the wall of the standard and projecting through suitable slotted openings 13 in said wall. A chain 14, attached at one end to the top of the float element 7, through the medium in the present instance of a turn buckle 15, extends upwardly over the sprocket 11, thence downwardly in the interior of the standard 3 to and under the sprocket 12, and again upwardly on the outside of the standard and at the opposite side thereof to a point of connection with the bottom of the element 7. Thus the terminal ends of the chain 14 are connected respectively to the top and bottom of the float element 7 at diametrically opposite sides of the latter. If desired, and in order to guide the chain 14 centrally through the standard 3, the standard may be provided with guide pins 16 and 17 behind which the chain passes as clearly illustrated. If desirable each of these pins may be provided with a roller to reduce friction between the chain and the pins. It is to be noted that in the assembly the standard 3 functions both as a guide for the float and a housing for chain 14.

Figure 4:
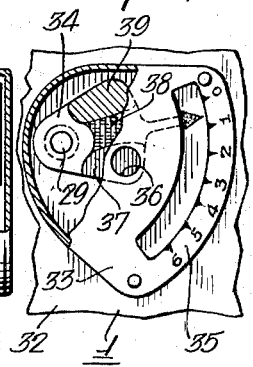
Fig. 4 is a front elevational view partly in section of the indicator portion of the gauge shown in Fig. 2.
Figure 3:
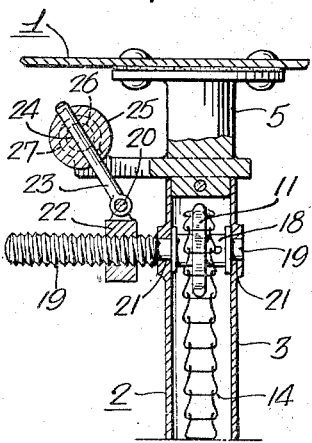
Fig. 3 is a sectional view on the line 3—3, Fig. 2.

The hub 18 of the sprocket 11 is attached to a threaded shaft 19, one end of this shaft being journaled as indicated at 21, 21 in the walls of the standard 3 and the other end of the shaft projecting outwardly from the standard and being threaded for reception of a follower nut 22. Pivotally secured at 20 to the upper end of the nut 22 is a pin 23 which passes freely through an aperture 24 in the enlarged portion 25 of a shaft 26, this shaft being journaled in bearings 27, 27 in the upper bracket fitting 5 of the standard 3. One end of the shaft 26 is connected through a suitable coupling 28 with a stub shaft 29, this latter being mounted for rotation in a sealed fitting 31 in the end wall 32 of the tender 1. The outer end of the shaft section 29 is embraced by a casing 33 secured against the outer face of the wall 32, this casing forming a housing for a pointer element 34 secured to the outer end of the shaft 29. The pointer 34, as illustrated in Fig. 4, cooperates with a dial 35 which, as more fully described hereinafter, indicates the position of the float 6 in the tank and which is graduated so as to afford a resonably accurate indication of the level of the water upon which the float is supported. The outer wall of the housing 33 is provided with an opening 36 through which the body portion of the pointer 34 is visible, and this body portion, which is enlarged as shown in Fig. 4, is provided with three segments 37, 38 and 39 which may be colored respectively red, yellow and green. This device provides a visual colored signal to indicate the general range of the liquid level in the tender tank.

The operation of the device as described above is as follows: When the tank 1 is filled with water the float 6 will ride to the top of the standard 3 and in the process will rotate the sprocket 11 clockwise as viewed in Fig. 2 with the result that the shafts 26 and 29 will be rotated in clockwise direction as viewed in Fig. 4 thereby causing the pointer 34 to move downwardly toward the bottom of the scale 35. This rotary movement of the shafts is effected by translational movement of the nut 22 on the screw 19 and the resulting angular movement of the pin 23 and of the shaft 26. The ability of the pin 23 to move longitudinally in the collar 25 of the shaft 26 compensates for the fact that the movement of the lower end of this pin, which is pivotally attached to the nut 22, is in a rectilinear path, the distances of various points of which with respect to the axis of the shaft 26 will vary.

As the water level gradually falls in the tank, the float 6 will move downwardly with the result that the pointer 34 is gradually moved upwardly on the dial 35 toward the zero position into which it moves as the float approaches the bottom of the tank. When the tank is full the green of the segment 39 of the pointer appears in the opening 36. This color changes to yellow as the tank approaches the half-empty condition, and beyond this point will register red to indicate that the tank is nearing the empty condition.

It is to be noted that the weight of the element 7 and the buoyancy of the element 9 of the float structure are sufficient to overcome all frictional resistance in the moving parts of the device and insure that the float shall move with the water level. It will be noted also that the sprocket 11 constitutes a medium for direct coordination of the concealed float 6 and the visible indicator 34—35, and that there is a constant relation between the position of the nut 22 on the sprocket actuated screw 19 and the elevation of the float 6 in the tank.

The embodiment of the invention illustrated in Figs. 5 to 8 inclusive employs the same basic principle of operation as that described above. In this case, however, the sprockets 41 and 42 are journaled in the top and bottom terminal fittings 43 and 44 of the standard assembly and are offset to opposite sides of the center line of the tubular standard member 45. With this arrangement the chain 46 may pass around the sprockets into a straight pass corresponding to the longitudinal center line of the said tubular standard. This avoids the necessity for the pins 16 and 17 of the previously described embodiment or their equivalent and still further reduces friction loss in the device. Friction is still further reduced by provision in the float structure of rollers 50, at both top and bottom, which engage the standard 45 and preclude sliding friction between the standard and the said structure.

In this case also it will be noted that the hub 47 of the sprocket 41 is internally threaded for reception of a threaded pin 48 which is slidably supported in a suitable guide 49 in the bracket fitting 43. This threaded pin thereby functions as a support for the sprocket 41 and also as a means for rotating the indicator shaft 51. For this latter purpose one end of the pin 48 has a pivotal connection with a pin 52 which passes freely through a diametrically disposed aperture within the large end portion 53 of the shaft 51. As the pin 48 is shifted longitudinally in the guide passage 49 as a result of rotation of the sprocket 41 and the threaded connection between the sprocket and the pin, the angularity of the pin 52 will be changed in obvious manner with the result that the indicator shaft 51 will be rotated.

The outer end of the shaft 51 carries a pointer 54, see Fig. 7, which coacts with a segmental dial 55 to indicate the position of the water level in the tank. In its movement from one extreme position to the other the pointer 54 successively engages three electrical contacts 56, 57 and 58, see Fig. 7, thereby completing electrical circuits through three differently colored signal lamps, 59, 61 and 62 respectively, whereby when the tank is nearing empty the lamp 59 will be energized as indicated in Fig. 7 to show a red light. When the tank is approximately half full the yellow light 61 will be energized to the exclusion of the others, and when the tank is full the green light 62 will be energized.

In general the operation of this embodiment of the invention is essentially the same as that of the embodiment previously described. It will be noted, however, that in this case means is provided for stopping the float at both ends of the travel thereof short of the sprockets. The lower stop is formed by the shoulder 63 at the top of the fitting 44, and a corresponding shoulder 64 at the lower end of the fitting 43 forms the upper stop. Obviously, other means might be employed for this purpose without departure from the invention.

The modified form of indicator device illustrated in Figs. 9 to 12 inclusive is mounted on the top wall of the tender tank 65 instead of on the side as in the previously described embodiments. In this case the tubular standard 66, which corresponds to the standards 3 and 45 of the previously described embodiments, is extended upwardly through the top wall 67 of the tank and has suitably secured to the upper end thereof a bracket or frame structure 68 which forms a support for the working elements of the indicator including the upper sprocket 69 over which the float chain 71 is trained. In this case the sprocket 69 is supported on a threaded shaft 72 with which the sprocket is in threaded engagement. The shaft 72 is slidably supported in suitable guides in the frame 68, whereas the sprocket is confined in the frame against axial movement as well shown in Fig. 10. When the sprocket is turned the shaft 72, by reason of the aforesaid threaded engagement, is traversed longitudinally in one direction or the other, depending upon the direction of sprocket rotation.

Secured to one end of the shaft 72 is a pointer element 73 which as the shaft is traversed longitudinally is caused to move over a dial 74 containing marks related to the depth of the liquid in the tank.

The frame 68 and the several operating elements mentioned above are housed within a removable casing 70 which in the present instance is pivotally secured to the frame as indicated at 75 so that it may be elevated to afford access to said operating parts, the opposite end of the casing being provided with a spring clip 76 which normally holds the casing in closed position as shown in Fig. 11. In the present instance the casing is provided with a transparent window 77 through which the pointer 73 and dial 74 are visible from the front of the tender.

The operation of this embodiment will be clear from the foregoing description and it will be noted that the straight line motion of the pointer 73 afforded by the use of a longitudinally traversable threaded shaft is calculated to afford an extremely accurate indication of the changing level of liquid in the tank.

The modification illustrated in Figs. 13 and 14 corresponds essentially to that illustrated in Figs. 9 to 12 inclusive, but differs from the latter in that the threaded shaft 78 which actuates the indicator pointer 79 is fixed against axial movement and is merely rotated by the actuating sprocket 81. The pointer 79 is mounted upon a follower nut 82 which has threaded engagement with the shaft 78 and which is slidably mounted on the frame 83, means being provided as indicated in Fig. 14 for preventing rotation of the follower nut 82 about the axis of the shaft 78. In this case actuation of the sprocket 81 by movement of the float in the tank is translated into longitudinal movement along the shaft 78 of the pointer 79. The usual dial 84 is provided for cooperation with the pointer 79 and the elements are arranged so that the position of the pointer 79 on the dial 84 is a true index of the level of the water in the tender tank.

In Figs. 15 and 16 a corresponding device is disclosed employing a rack and pinion for actuation of the dial pointer 85. The sprocket 86 on which the float chain 87 operates is carried by a shaft 88 at one end of which is mounted a pinion 89. This pinion meshes with a toothed rack 91 which is mounted in the supporting structure for longitudinal sliding movement. As illustrated the pointer 85 is carried by the rack.

Rotation of the sprocket 86 in this instance results in a corresponding longitudinal movement of the rack 91 and movement of the pointer 85 across the dial of the indicator. This type of indicator actuating mechanism has an advantage residing in the fact that the traverse movement of the pointer may be made relatively great in proportion to the angular movement of the actuating sprocket by merely increasing the diameter of the rack pinion whereby a relatively wide spacing of the dial indications is practical. Obviously the rack 91 may be other than straight if desired and may in fact take the form of a gear, either external or internal. Obviously also, the dial scale may be applied to the rack for cooperation with a fixed pointer without departing from the invention.

I claim:

1. In a liquid level indicator, a float adapted to rise and fall with the level of said liquid, a standard constituting a guide for said float, a sprocket at top and bottom respectively of said standard, a chain having its ends secured to the float respectively at opposite sides of said standard, said chain passing around each of said sprockets and extending from one of said sprockets to the other substantially in alignment with the vertical center line of said float, and means associated with one of said sprockets for indicating the position of the float between said sprockets.

2. In a liquid level indicator, a float adapted to rise and fall with the level of said liquid, a standard constituting a guide for said float, a sprocket at top and bottom respectively of said standard, a chain having its ends secured to the float respectively at opposite sides of said standard, said chain passing around each of said sprockets and extending from one of said sprockets to the other and said sprockets being relatively offset to opposite sides of the vertical center line of said float so that the portion of the chain passing from one to the other of the sprockets will follow a straight path along said center line, and means associated with one of said sprockets for indicating the position of the float between said sprockets.

3. A liquid level indicator according to claim 1 wherein the float embraces the standard which is made hollow to afford a passageway for the chain in passing from one to the other of said sprockets.

4. A liquid level indicator according to claim 2 wherein the float embraces the standard which is made hollow to afford a passage for the straight line run of the chain extending from the one sprocket to the other.

EUGENE Y. GUTHMANN.

REFERENCES CITED

The following references are of record in the file of this patent:

UNITED STATES PATENTS

| Number | Name | Date |
|---|---|---|
| 763,716 | Bray | June 28, 1904 |
| 1,270,655 | Page | June 25, 1918 |
| 1,378,327 | Cox | May 17, 1921 |
| 1,504,025 | Corset | Aug. 5, 1924 |
| 1,918,672 | Szabo | July 18, 1933 |

FOREIGN PATENTS

| Number | Country | Date |
|---|---|---|
| 303,474 | Italy | Dec. 3, 1932 |
| 357,799 | Italy | Mar. 28, 1938 |